United States Patent
Su et al.

(10) Patent No.: US 11,967,722 B2
(45) Date of Patent: Apr. 23, 2024

(54) FOLDED BIPOLAR BATTERY DESIGN

(71) Applicant: GM GLOBAL TECHNOLOGY OPERATIONS LLC, Detroit, MI (US)

(72) Inventors: Qili Su, Shanghai (CN); Zhe Li, Anda (CN); Meiyuan Wu, Shanghai (CN); Mengyan Hou, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 17/560,673

(22) Filed: Dec. 23, 2021

(65) Prior Publication Data

US 2023/0072660 A1   Mar. 9, 2023

(30) Foreign Application Priority Data

Sep. 7, 2021   (CN) .......................... 202111044253.5

(51) Int. Cl.
*H01M 4/78* (2006.01)
*H01M 4/02* (2006.01)

(52) U.S. Cl.
CPC ........ *H01M 4/78* (2013.01); *H01M 2004/029* (2013.01)

(58) Field of Classification Search
CPC ... H01M 4/78; H01M 2004/029; Y02E 60/10; Y02P 70/50
See application file for complete search history.

(56) References Cited

U.S. PATENT DOCUMENTS

| | | | |
|---|---|---|---|
| 6,120,563 A * | 9/2000 | Kraft | H01M 50/119 29/623.1 |
| 10,714,756 B2 | 7/2020 | Dai et al. | |
| 2004/0161667 A1* | 8/2004 | Fukuzawa | H01M 10/0525 429/185 |
| 2014/0004399 A1* | 1/2014 | Kim | H01M 10/0587 429/94 |
| 2017/0271708 A1* | 9/2017 | Yoshima | H01M 10/48 |
| 2020/0036053 A1 | 1/2020 | Li et al. | |
| 2020/0036070 A1 | 1/2020 | Li et al. | |
| 2020/0119357 A1 | 4/2020 | Hou et al. | |
| 2020/0403267 A1 | 12/2020 | Li et al. | |
| 2021/0020929 A1 | 1/2021 | Kong et al. | |
| 2021/0021009 A1 | 1/2021 | Li et al. | |
| 2021/0028481 A1 | 1/2021 | Hou et al. | |
| 2021/0036310 A1 | 2/2021 | Hou et al. | |
| 2021/0036360 A1 | 2/2021 | Li et al. | |
| 2021/0036373 A1 | 2/2021 | Li et al. | |
| 2021/0050157 A1 | 2/2021 | Hou et al. | |
| 2021/0050596 A1 | 2/2021 | Li et al. | |
| 2021/0057776 A1 | 2/2021 | Lu et al. | |
| 2021/0066746 A1 | 3/2021 | Hou et al. | |

(Continued)

OTHER PUBLICATIONS

U.S. Appl. No. 17/038,761, filed Sep. 30, 2020, Frieberg et al.

(Continued)

*Primary Examiner* — Matthew T Martin
*Assistant Examiner* — Bartholomew A Hornsby

(57) ABSTRACT

A battery includes positive and negative current collectors and a plurality of bipolar electrodes arranged in a stack between the positive and negative current collectors. The positive and negative current collectors and the stack of the plurality of bipolar electrodes are folded in an S-shape.

20 Claims, 11 Drawing Sheets

(56) References Cited

U.S. PATENT DOCUMENTS

| | | | |
|---|---|---|---|
| 2021/0111426 A1 | 4/2021 | Li et al. | |
| 2021/0135224 A1 | 5/2021 | Hou et al. | |
| 2021/0408609 A1* | 12/2021 | Nanni | H01G 11/82 |
| 2022/0140422 A1 | 5/2022 | Chen et al. | |
| 2022/0263055 A1 | 8/2022 | Hou et al. | |
| 2022/0263129 A1 | 8/2022 | Lu et al. | |
| 2022/0302526 A1 | 9/2022 | Li et al. | |
| 2022/0407079 A1 | 12/2022 | Lu et al. | |
| 2023/0015143 A1 | 1/2023 | Su et al. | |
| 2023/0024667 A1 | 1/2023 | Li et al. | |
| 2023/0025830 A1 | 1/2023 | Su et al. | |
| 2023/0046608 A1 | 2/2023 | Su et al. | |

OTHER PUBLICATIONS

U.S. Appl. No. 17/171,489, filed Feb. 9, 2021, Frieberg.
U.S. Appl. No. 17/481,179, filed Sep. 21, 2021, Li et al.
U.S. Appl. No. 17/522,331, filed Nov. 9, 2021, Li et al.
U.S. Appl. No. 17/542,299, filed Dec. 3, 2021, Li et al.
U.S. Appl. No. 17/543,160, filed Dec. 6, 2021, Lu et al.

\* cited by examiner

FOLDED BIPOLAR BATTERY DESIGN

CROSS-REFERENCE TO RELATED APPLICATIONS

This application claims the benefit of Chinese Patent Application No. 202111044253.5, filed on Sep. 7, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to batteries and more particularly to a folded bipolar battery design.

With proliferation of electric vehicles, demand for batteries having compact size and relatively high energy densities is increasing. Bipolar batteries are becoming increasingly popular for applications such as electric vehicles. In current designs of the bipolar batteries, a plurality of bipolar electrodes is typically packaged in a battery container by stacking or winding the bipolar electrodes. The stacking-type bipolar batteries (i.e., in which the bipolar electrodes are stacked one above the other in a battery container) suffer from a high risk of contamination that can result from electrode punching used during stacking. The stacking-type bipolar batteries also suffer from internal short-circuit problems that can result from failure of a blocker used to isolate adjacent bipolar electrodes. The wound-typed bipolar battery (i.e., in which a stack of bipolar electrodes is wound like a bale of hay or like a roll of carpet in a battery container) suffer from non-uniform pressure on electrodes and inefficient container space utilization. Thus, it is very challenging to package the stack of bipolar electrodes in a battery container.

SUMMARY

A battery comprises positive and negative current collectors and a plurality of bipolar electrodes arranged in a stack between the positive and negative current collectors. The positive and negative current collectors and the stack of the plurality of bipolar electrodes are folded in an S-shape.

In another feature, the battery further comprises a plurality of layers of a flexible ion conducting film arranged between the positive and negative current collectors and between the bipolar electrodes.

In other features, each of the bipolar electrodes comprises a plurality of cathodes and anodes and a bipolar current collector that extends along lengths of the positive and negative current collectors. The cathodes and the anodes are arranged on opposite sides of the bipolar current collector. A spacing between the cathodes and between the anodes increases from first to last ones of the bipolar electrodes in a first fold of the S-shaped stack and decreases from the last to the first ones of the bipolar electrodes in a second fold of the S-shaped stack.

In another feature, the battery further comprises a plurality of layers of a flexible ion conducting film arranged between the positive and negative current collectors and between the bipolar electrodes. The positive and negative current collectors respectively comprise pluralities of cathodes and anodes. The cathodes and anodes of the plurality of bipolar electrodes and the pluralities of cathodes and anodes of the positive and negative current collectors are vertically aligned with each other across the folds of the S-shaped stack. Only portions of the positive and negative current collectors, the layers of the flexible ion conducting film, and the bipolar current collectors of the bipolar electrodes extend through the folds of the S-shaped stack.

In another feature, the battery further comprises a blocker arranged along edges of the bipolar electrodes, in the spacing between the cathodes and between the anodes of the bipolar electrodes, or both.

In other features, the positive and negative current collectors respectively comprise first and second pluralities of tabs. The first plurality of tabs are offset relative to the second plurality of tabs in the S-shaped stack.

In other features, the battery further comprises an additional current collector and a second plurality of bipolar electrodes arranged in a second stack between the additional current collector and one of the positive and negative current collectors. The additional current collector and the second plurality of bipolar electrodes are folded in the S-shape along with the positive and negative current collectors and the stack of the plurality of bipolar electrodes.

In another feature, the bipolar electrodes are coated with a solid state electrolyte.

In another feature, the bipolar electrodes are coated with a solid state electrolyte, the battery further comprising a blocker arranged in a spacing between individual electrodes of the bipolar electrodes.

In other features, the bipolar electrodes are coated with a solid state electrolyte. Each of the bipolar electrodes comprises a plurality of cathodes and anodes arranged on opposite sides of a bipolar current collector. The positive and negative current collectors respectively comprise pluralities of cathodes and anodes. The cathodes and anodes of the plurality of bipolar electrodes and the pluralities of cathodes and anodes of the positive and negative current collectors are vertically aligned with each other across the folds of the S-shaped stack. Only portions of the positive and negative current collectors and bipolar current collectors of the bipolar electrodes extend through the folds of the S-shaped stack.

In another feature, the battery further comprises a blocker arranged in a spacing between the cathodes and between the anodes of the bipolar electrodes.

In other features, the flexible ion conducting film comprises a material that conducts ions without conducting electrons. The material includes one or more of a free-standing gel, a combination of a polymer and a lithium salt, a combination of a polymer and a solid state electrolyte, a combination of a separator and a liquid electrolyte.

In other features, the bipolar current collector provides electronic conductivity without providing ionic conductivity. The bipolar current collector comprises a metal foil, a clad foil, a combination of a polymer and carbon, or a combination of a polymer and metal particles.

In other features, each of the bipolar electrodes comprise a plurality of cathodes and anodes. The cathodes and the anodes comprise active materials that provide electronic conductivity and an ion conducting agent that provides ionic conductivity.

In other features, the cathodes and the anodes further comprise carbon that provides electronic conductivity. The ion conducting agent includes one or more of a solid electrolyte, a gel, a combination of a polymer and a lithium salt, or a liquid electrolyte.

In other features, each of the bipolar electrodes comprises a plurality of cathodes and anodes arranged on opposite sides of a bipolar current collector. A spacing between the cathodes and between the anodes increases from first to last ones of the bipolar electrodes in a first fold of the S-shaped stack and decreases from the last to the first ones of the bipolar electrodes in a second fold of the S-shaped stack.

In another feature, the first and second folds are located after successive ones of the cathodes.

In another feature, the first and second folds are located after alternating ones of the cathodes.

In other features, each of the bipolar electrodes comprises a plurality of cathodes and anodes arranged on opposite sides of the bipolar current collector. A spacing between the cathodes. The anodes increases from first to last ones of the bipolar electrodes in a first fold of the S-shaped stack and decreases from the last to the first ones of the bipolar electrodes in a second fold of the S-shaped stack.

In another feature, the first and second folds are located after successive or alternating ones of the cathodes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Bipolar batteries improve energy density of a battery pack by reducing connecting tabs, battery packaging, and cooling systems. However, packaging a stack of bipolar electrodes inside a conventional battery container by stacking or winding is challenging. The stacking-type bipolar batteries suffer from risks of contamination from electrode pouching and risks of internal short-circuit due to blocker failure. The wound-type bipolar batteries suffer from non-uniform pressure on electrodes and low or inefficient utilization of space in the battery container.

The present disclosure provides a bipolar battery design where a length of stacked bipolar electrodes is folded in an S-shape, which increases utilization of space in the battery container and provides significant scalability as explained below. Other features of the design include intermittent coating of electrodes, electrode gelation, and so on. These and other features of the present disclosure are described below in detail.

The present disclosure is organized as follows. A stacking-type bipolar battery is shown and described with reference to FIG. 1. A wound-type bipolar battery is shown and described with reference to FIG. 2. An S-shaped folded stack type battery according to the present disclosure is shown and described with reference to FIG. 3. An example of a bipolar electrode is shown and described with reference to FIGS. 4 and 5. A folding process used to manufacture the S-shaped folded stack type battery is shown and described with reference to FIGS. 6A-6C. An example layout of electrodes for manufacturing the S-shaped folded stack type battery is shown and described with reference to FIG. 7. An example of a folding scheme and layout of tabs on current collectors is shown and described with reference to FIG. 8. Examples of using blockers with the S-shaped folded stack type battery are shown and described with reference to FIGS. 9A-10B. Additional examples of folding and stacking schemes are shown and described with reference to FIGS. 11A and 11B. Additional designs of bipolar electrodes are shown and described with reference to FIGS. 12A-12C.

Figure 1:
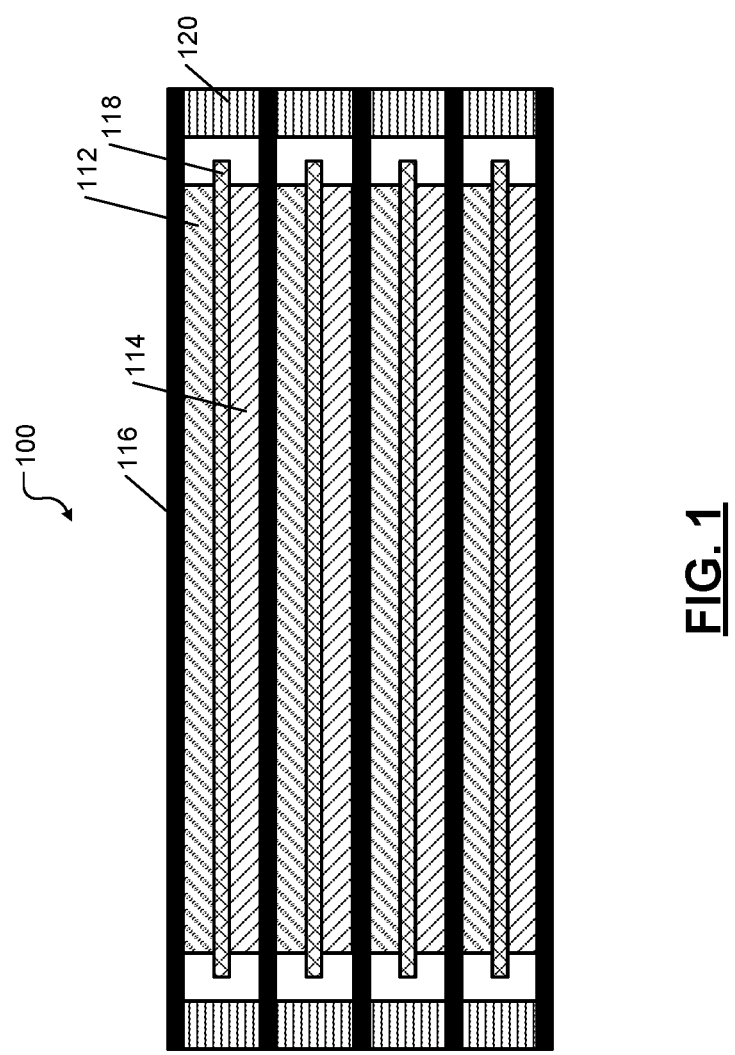
FIG. 1 shows a stacking-type bipolar battery.

FIG. 1 shows a cross-section of a stack 100 of bipolar electrodes used to manufacture stacking-type bipolar batteries. The stack 100 comprises a plurality of bipolar electrodes that are stacked vertically on top of one another along a vertical axis (e.g., the Z-axis of the Cartesian coordinate system). A length of the stack 100 extends along a horizontal axis (e.g., the X-axis of the Cartesian coordinate system). A continuous length of vertically stacked bipolar electrodes, which is N times the length of the stack 100, where N is an integer greater than 1, is sliced vertically along the Z-axis at predetermined distances along the X-axis (i.e., along the length of the stack 100). Each slice represents the stack 100. The predetermined distance, which is the length of the stack 100 along the X-axis, depends on dimensions (e.g., length) of the bipolar batteries measured along the X-axis. Multiple slices (i.e., stacks 100) are arranged (i.e., stacked) on top of one another along the Z-axis according to the dimensions (e.g., height) and power requirements of the bipolar batteries used in a particular application. The width of the stack 100 depends on the width of the bipolar batteries, which is measured along the Y-axis of the Cartesian coordinate system.

In FIG. 1, the stack 100 comprises a plurality of bipolar electrodes stacked vertically on top of one another along the Z-axis. Each bipolar electrode comprises a cathode 112 and an anode 114 separated by a bipolar current collector 116. The bipolar current collector 116 conducts electrons without conducting lithium ions. Specifically, the bipolar current collector 116 transports electronic charge carriers from cathode to anode (or anode to cathode) in the bipolar electrode without transporting ionic charges. The bipolar current collector 116 can be a metal foil, a clad foil (e.g., Al—Cu foil), a combination of a polymer and carbon, or a combination of a polymer and metal particles. A layer of a gel 118 is arranged between each bipolar electrode. Specifically, the gel 118 is disposed between a cathode 112 of a bipolar electrode and an anode 114 of an adjacent bipolar electrode. A blocker 120 is disposed on either side of the stack 100. The bipolar current collector 116 extends to the blocker 120. Multiple stacks 100 including the blocker 120 extending on either side of the multiple stacks 100 along the Z-axis are arranged in a battery container (shown in FIG. 2).

Figure 2:
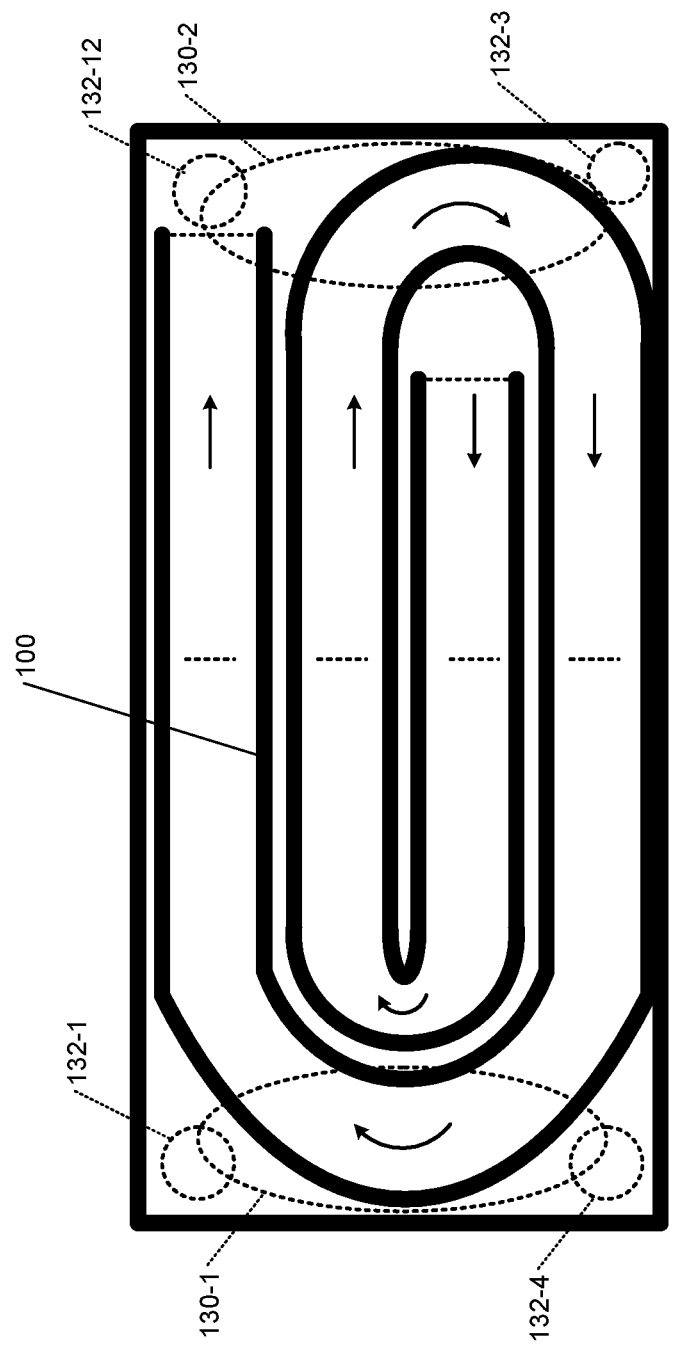
FIG. 2 shows a wound-type bipolar battery.

FIG. 2 shows a cross-section of a wound-type bipolar battery in which a continuous length of vertically stacked bipolar electrodes and layers of the gel 118, where the continuous length is N times the length of the stack 100, and where N is an integer greater than 1, is wound like a bale of hay or like a roll of carpet in a battery container 102. For simplicity of illustration, the individual bipolar electrodes and the layers of the gel 118 are not shown.

The pressure on the wound stack in regions 130-1, 130-2 is non-uniform. At the turns of the wound stack, the outer in regions 130-1, 130-2 of the wound stack that are closer to the sidewalls of the battery container 102 experience a greater pressure than the portions of the wound stack that are away from the sidewalls and that are closer to the center of the battery container 102. Further, the space in the battery container 102 is not efficiently utilized. For example, dead spaces 132-1, 132-2, 132-3, 132-4 are left unused in the battery container 102 by the wound stack.

Figure 3:
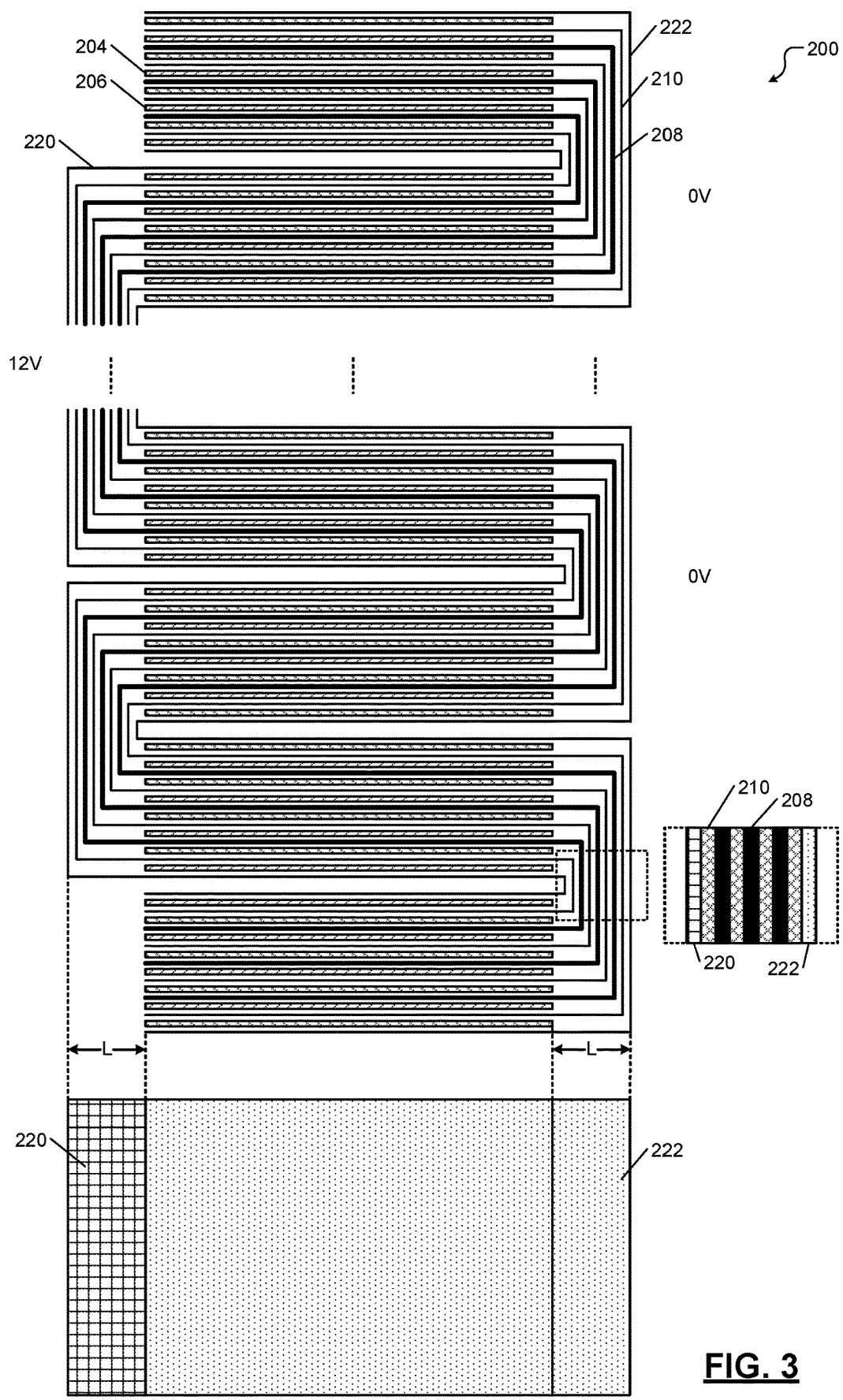
FIG. 3 shows an S-shaped folded stack type battery according to the present disclosure.

FIG. 3 shows a cross-section of an S-shaped stack 200 of bipolar electrodes, where a length of N vertically stacked bipolar electrodes is folded in an S-shape along the Z-axis, where N is an integer greater than 1. A length of vertically stacked bipolar electrodes is initially sliced along the Z-axis at a predetermined distance that is greater than the length of the battery container measured along the X-axis. For example, the length of the vertically stacked bipolar electrodes is greater than N times the length of the stack 100 shown in FIG. 1, where N is an integer greater than 1. The sliced portion of length of the vertically stacked bipolar electrodes is then folded in the form of an S-shape and packed by applying pressure on the folded stack along the Z-axis to fit the folded stack in a battery container.

The bipolar batteries designed using the S-shaped stacks of the bipolar electrodes do not suffer from contamination, which occurs due to electrode punching used in the stacking-type bipolar batteries. The bipolar batteries designed using the S-shaped stacks of the bipolar electrodes also utilize the space in the battery container more efficiently than the wound-type bipolar batteries. The bipolar batteries designed using the S-shaped stacks of the bipolar electrodes have significantly smaller dead spaces in the battery container than the wound-type bipolar batteries. Further, the S-shaped stacking provides scalability since the stack of the bipolar electrodes can be folded in the S-shape along the Z-axis to any height to match the height of the battery container. Various stacking and folding schemes described below further enhance scalability.

In FIG. 3, the S-shaped stack 200 of bipolar electrodes comprises a plurality of bipolar electrodes stacked vertically on top of one another along the Z-axis. Each bipolar electrode comprises a plurality of cathodes 204 and a plurality of anodes 206 separated by a bipolar current collector 208. The cathodes 204 and the anodes are arranged on opposite sides of the bipolar current collector 208 along the length of the bipolar current collector 208. The bipolar current collector 208 extends throughout the length of the S-shaped stack 200. The anodes 206 are slightly longer than the cathodes 204.

The cathodes 204 are separated (i.e., spaced) from each other by first predetermined distances. The anodes 206 are separated (i.e., spaced) from each other by second predetermined distances. The first and second predetermined distances are selected too allow folding of the length of vertically stacked bipolar electrodes between the cathodes 204 and the anodes 206 as shown. The first and second predetermined distances are shown and described in detail with reference to FIG. 7.

The S-shaped stack 200 is shown before folding in FIGS. 6A, 8, 11A, and 11B. FIGS. 6A, 8, 11A, and 11B also show locations where the S-shaped stack 200 can be folded. The structure of the bipolar electrode is described below in further detail with reference to FIGS. 4 and 5.

A layer of a flexible ion conducting film 210 (hereinafter called the gel 210 for convenience) is disposed between each bipolar electrode. Specifically, the gel 210 is disposed between the cathodes 204 of a first bipolar electrode and the anodes 206 of an adjacent bipolar electrode. The gel 210 extends throughout the length of the S-shaped stack 200 along the X-axis. The bipolar current collector 208 and the gel 210 extend through each turn of the S-shaped stack 200. Due to the selection of the first and second predetermined distances, the cathodes 204 and the anodes 206 are not present in the turns (i.e., the folds) of the S-shaped stack 200.

A positive current collector 220 and a negative current collector 222 are arranged along first and second sides of the S-shaped stack 200 along the length of the S-shaped stack 200. Accordingly, the positive and negative current collectors 220, 222 extend throughout the length of the S-shaped stack 200 along the X-axis, including through the turns (i.e., the folds) of the length of the S-shaped stack 200. The stack of the bipolar electrodes and the layers of the gel 210 are sandwiched between the positive and negative current collectors 220, 222 along the length of the S-shaped stack 200.

The positive current collector 220 is arranged above the top bipolar electrode in the S-shaped stack 200. Specifically, a layer of the gel 210 is arranged on the anodes 206 of the top bipolar electrode in the S-shaped stack 200, and the positive current collector 220 is arranged on the layer of the gel 210 that is arranged on the anodes 206 of the top bipolar electrode. A layer of the cathodes 204 is arranged on an inner surface of the positive current collector 220 so that the layer of the cathodes 204 on the inner surface of the positive current collector 220 is sandwiched between the inner surface of the positive current collector 220 and the layer of the gel 210 that is arranged on the anodes 206 of the top bipolar electrode.

While the positive current collector 220 extends along the length of the S-shaped stack 200, the cathodes 204 on the inner surface of the positive current collector 220 do not extend through and are not present in the turns (i.e., folds) of the S-shaped stack 200. The positive current collector 220 and the layer of the gel 210 adjacent to the positive current collector 220 fold along with the bipolar electrodes and the layers of the gel 210 adjacent to the bipolar electrodes as shown. The cathodes 204 on the inner surface of the positive current collector 220 are separated (i.e., spaced) from each other to allow folding of the S-shaped stack 200 as shown.

The negative current collector 222 is arranged below the bottom bipolar electrode in the S-shaped stack 200. Specifically, a layer of the gel 210 is arranged on the cathodes 204 of the bottom bipolar electrode in the S-shaped stack 200, and the negative current collector 222 is arranged on the layer of the gel 210 that is arranged on the cathodes 204 of the bottom bipolar electrode. A layer of the anodes 206 is arranged on an inner surface of the negative current collector 222 so that the layer of the anodes 206 on the inner surface of the negative current collector 222 is sandwiched between the inner surface of the negative current collector 222 and the layer of the gel 210 that is arranged on the anodes 206 of the bottom bipolar electrode.

While the negative current collector 222 extends along the length of the S-shaped stack 200, the anodes 206 on the inner surface of the negative current collector 222 do not extend through and are not present in the turns (i.e., folds) of the S-shaped stack 200. The negative current collector 222 and the layer of the gel 210 adjacent to the negative current collector 222 fold along with the bipolar electrodes and the layers of the gel 210 adjacent to the bipolar electrodes as shown. The anodes 206 on the inner surface of the negative current collector 222 are separated (i.e., spaced) from each other to allow folding of the S-shaped stack 200 as shown.

Accordingly, in general, the S-shaped stack 200 comprises N bipolar electrodes, the positive current collector 220, the negative current collector 222, and N+1 layers of the gel 210 stacked vertically on top of one another along the Z-axis in the order described above, where N is an integer greater than 1. The bipolar electrodes and the positive and negative current collectors 220, 222 have structures described above.

In FIG. 3 (and also in FIGS. 6C and 7), the N bipolar electrodes, the positive current collector 220, the negative current collector 222, and N+1 layers of the gel 210 are shown as not contacting (i.e., as having gaps between) each other for illustrative purposes. In fact, these elements contact each other (i.e., have no gaps between them) as shown in FIGS. 6A, 8, 11A, and 11B. The exploded view on the side of FIG. 3 shows the shading used for different elements, which is consistently used throughout the present disclosure.

The S-shaped stack 200 is packed in a battery container by applying pressure from top and/or bottom of the S-shaped stack 200 along the Z-axis. The S-shaped stack 200 is scalable in that the length of the N vertically stacked bipolar electrodes along with the N+1 layers of the gel 210 and the positive and negative current collectors 220, 220 is folded M times in the S-shape along the Z-axis, where M is an integer greater than 1, where M is selected according to the height of the battery container, and where N and M are selected according to the power requirements of the battery.

In FIG. 3, in each fold of the S-shaped stack 200, the total length of the fold measured along the X-axis (i.e., along the length of the battery) is a sum of the length of the bipolar electrodes and lengths L of the turns on either side of the bipolar electrodes. A first side of the folds of the S-shaped stack 200 has the positive current collector 220 as the outermost layer, which forms a first terminal of the battery. A second side of the folds of the S-shaped stack 200 has the negative current collector 222 as the outermost layer, which form a second terminal of the battery.

At the bottom of FIG. 3, a top view of the S-shaped stack 200 is shown with the negative current collector 222 being the last layer on top of the S-shaped stack 200. The shadings shown in the top view will be opposite if the positive current collector 220 is the last layer on top of the S-shaped stack 200.

Figure 4:
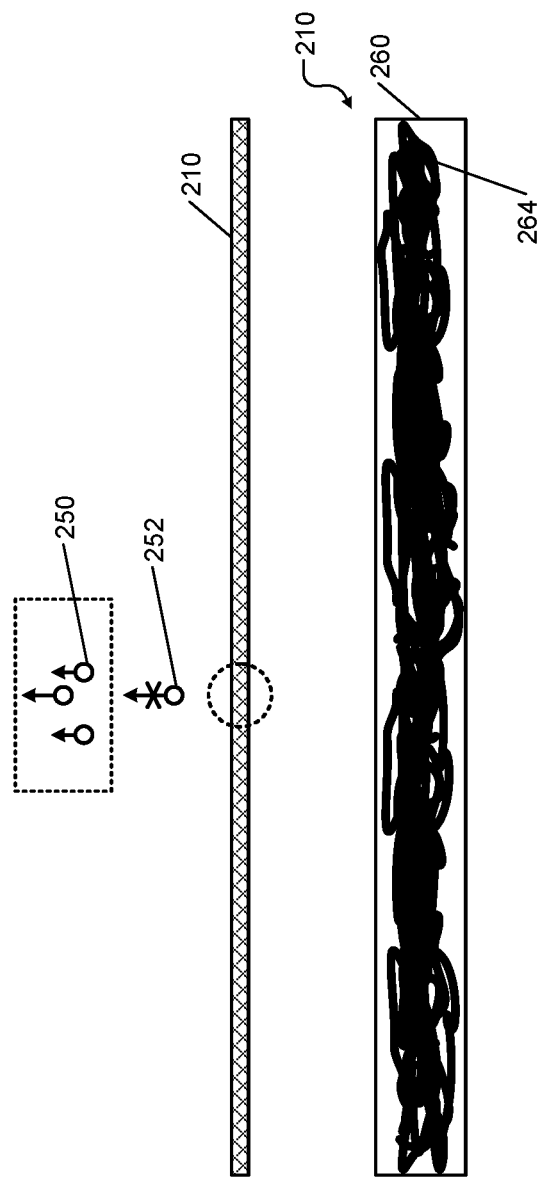
FIGS. 4 and 5 show an example of a bipolar electrode used in the S-shaped folded stack type battery according to the present disclosure.

FIG. 4 shows the gel 210, which is a flexible ion conducting film. The flexible ion conductive film can be a free-standing gel, a combination of a polymer and a lithium salt, a combination of a polymer and a solid state electrolyte, or a combination of a separator and a liquid electrolyte. The flexible ion conductive film conducts lithium ions 250 (the ion conduction is called ionic conductivity) without conducting electrons 252 (the electron conduction is called electronic conductivity).

In FIG. 4, when the flexible ion conductive film includes a combination of a separator and a liquid electrolyte, the separator includes a polymeric membrane 260 that forms a microporous layer. A liquid electrolyte 264 within the polymeric membrane 260 fills the pores and provides maximum ionic conductivity.

Figure 5:
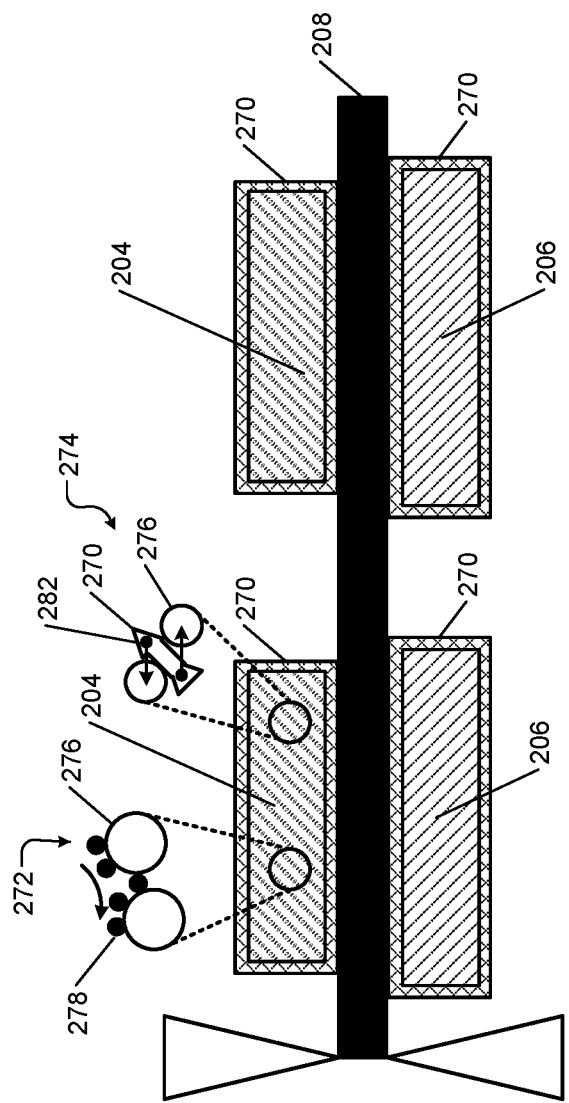

FIG. 5 shows the bipolar electrode of FIG. 3 in detail. As described above, the cathodes 204 and the anodes 206 are arranged on opposite sides of the bipolar current collector 208. The up and down facing triangles on the side of FIG. 5 (and in FIGS. 12A and 12B) indicate the directions in which pressure is applied when stacking the bipolar electrodes. The bipolar electrode is formed using either of the following methods. In a first method, a slurry is used to fabricate the bipolar electrode. The slurry is a combination of active materials (e.g., cathode and anode materials), conductive carbon and a polymer, and a solvent that dissolves the polymer. After coating the slurry on a foil, drying the solvent, and calendaring, the bipolar electrode is formed. The conductive carbon provides electronic conductivity within the cathodes 204 or the anodes 206. Subsequently, a gelation process is performed on the bipolar electrode. Specifically, the gelation process coats the cathodes 204 and the anodes 206 with a material 270 providing ionic conductivity. For example, the material 270 can be a gel electrolyte providing ionic conductivity within the cathodes 204 or the anodes 206. Alternatively, a liquid electrolyte can be used instead of the gel electrolyte.

In a second method, a slurry is used to fabricate the bipolar electrode. The slurry is a combination of active materials (e.g., cathode and anode materials), conductive carbon and a polymer, and a solvent that dissolves the polymer, and a material 270 providing ionic conductivity. After coating the slurry on a foil, drying the solvent, and calendaring, the bipolar electrode is formed. The conductive carbon provides electronic conductivity within the cathodes 204 or the anodes 206. The material 270 provides ionic conductivity within the cathodes 204 or the anodes 206. For example, a solid-state electrolyte can be used as the material 270 providing ionic conductivity in these electrodes. Alternatively, a combination of an ion conducting polymer and a lithium salt can be used instead of the solid-state electrolyte.

Exploded views 272 and 274 show the internal compositions of these electrodes in further detail. As shown in view 272, these electrodes include a combination of an active material 276 and carbon 278 that provides electronic conduction (shown by a curved arrow above the carbon 278) in these electrodes. As shown in view 274, these electrodes include a combination of the active material 276 and the material 270 that provides ionic conduction in these electrodes. For example, the material 270 may include a solid electrolyte, a gel, a combination of a polymer and a lithium salt, or a liquid electrolyte. Ions 282 flow through the material 270 to the active material 276.

Figure 6A:
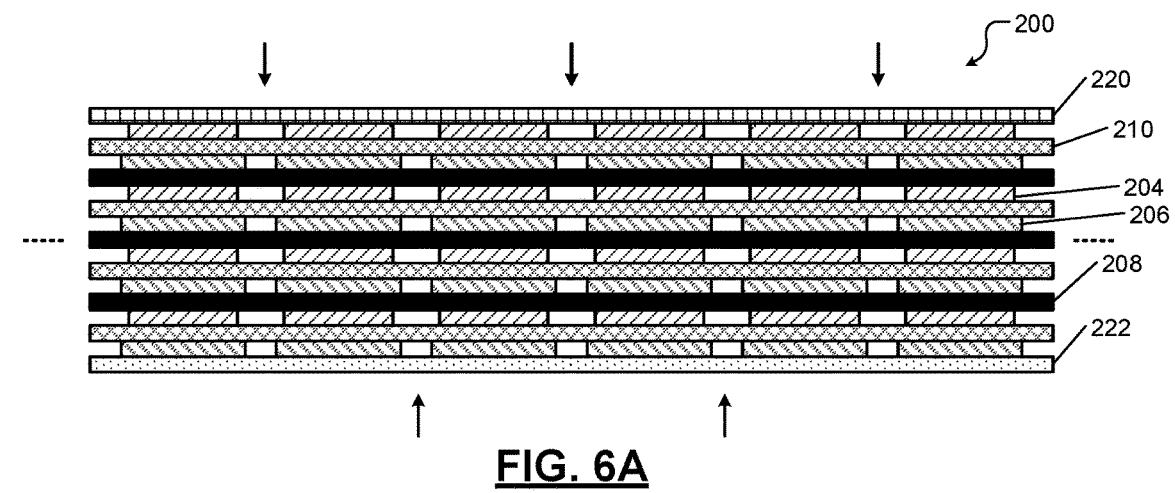
FIGS. 6A-6C show a folding process used to manufacture the S-shaped folded stack type battery according to the present disclosure.
Figure 6B:
Figure 6C:
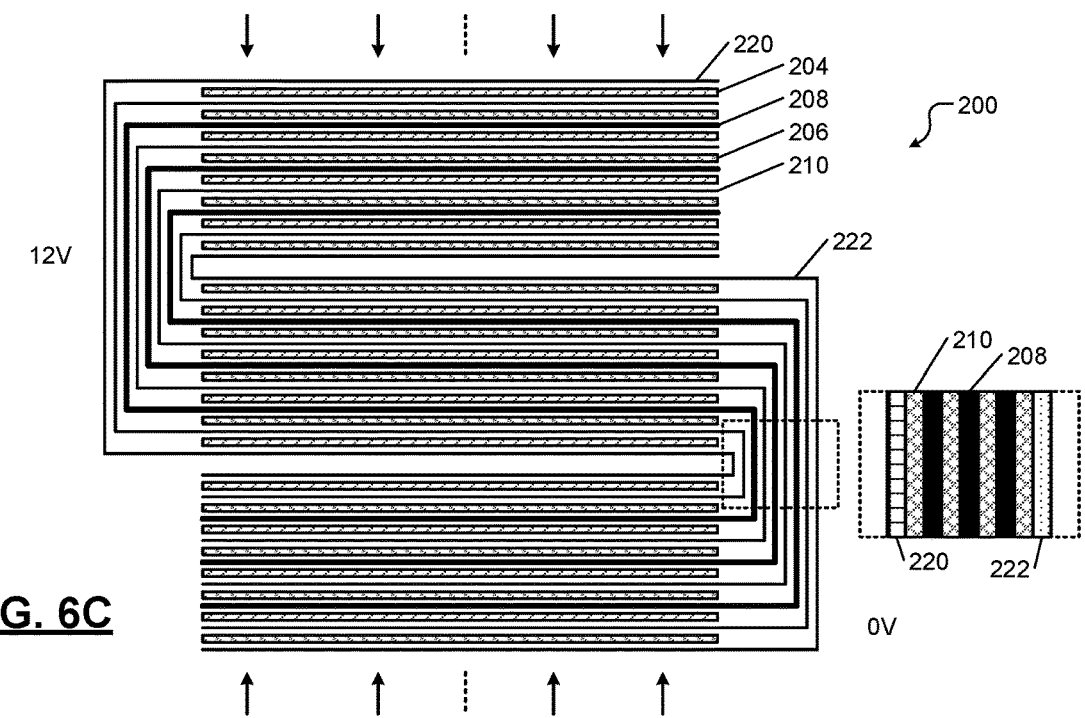
Figure 11A:
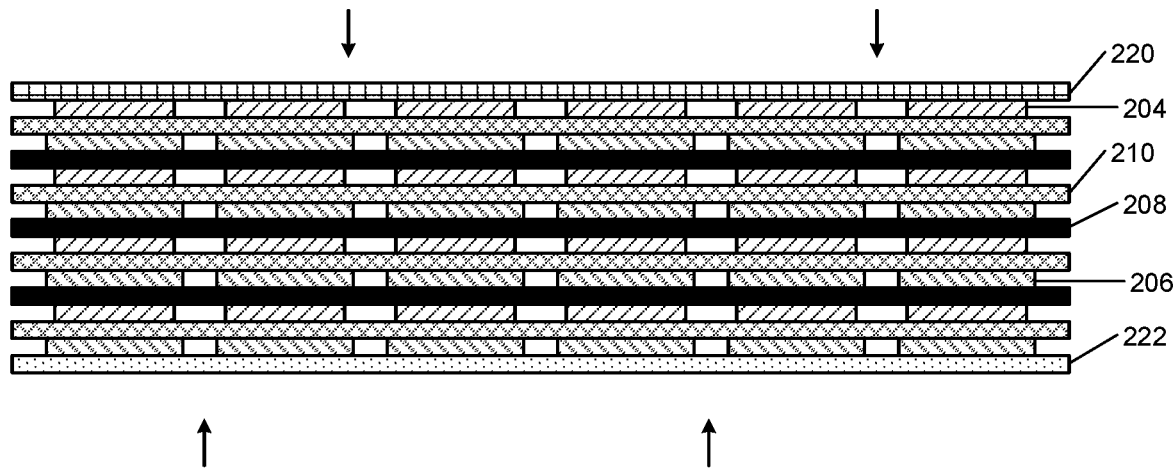
FIGS. 11A and 11B show additional examples of folding and stacking schemes for manufacturing the S-shaped folded stack type battery according to the present disclosure.
Figure 11B:
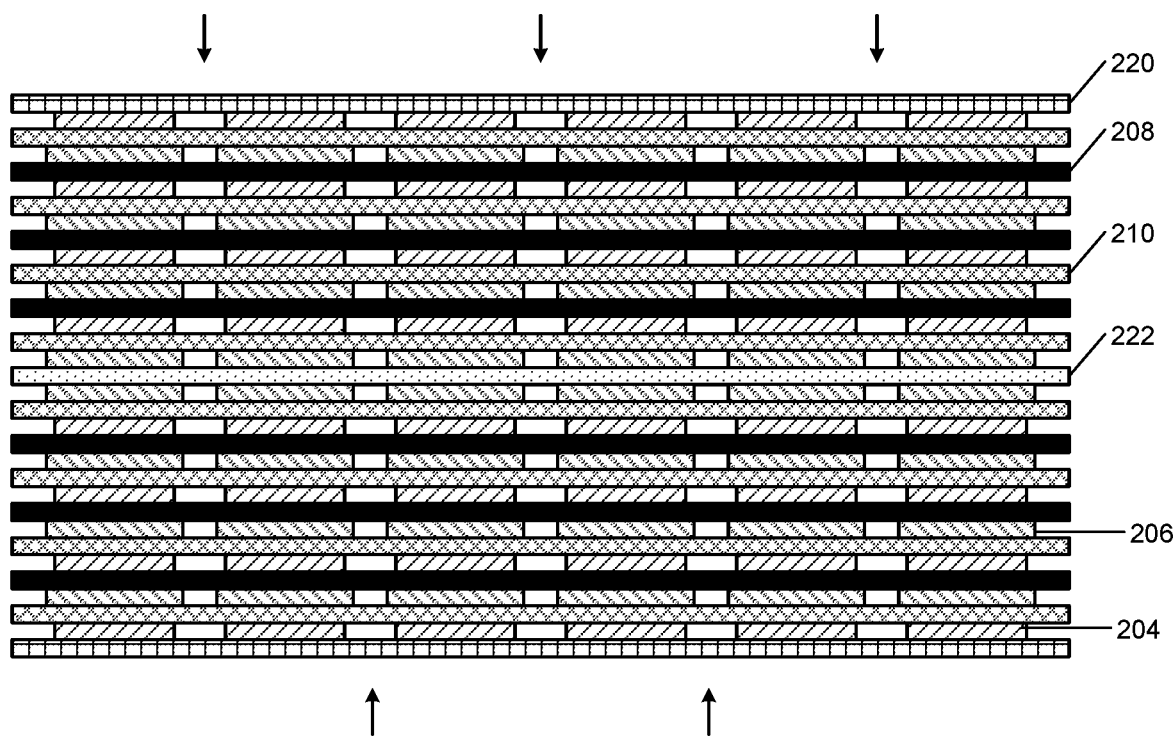

FIGS. 6A-6C show a manner of forming of the S-shaped stack 200. FIG. 6A shows a continuous length of a stack of the bipolar electrodes, the layers of the gel 210, and the positive and negative current collectors 220, 222 described above with reference to FIG. 3 from which the S-shaped stack 200 is formed. In FIG. 6A, arrows point to locations where folding is performed along the length of the stack. The folding can be performed along the length of the stack in other ways. Examples of other ways in which folding can be performed along the length of the stack are shown in FIGS. 11A and 11B.

FIG. 6B shows the manner of folding the stack at locations indicated by arrows in FIG. 6A. Specifically, the folding follows the shape of the letter S. FIG. 6C shows the S-shaped stack 200 that is formed after pressing the folded stack from the top and bottom. Again, the S-shaped stack 200 can be of any desired height measured along the Z-axis as described above with reference to FIG. 3. The description is therefore omitted for brevity.

Figure 7:
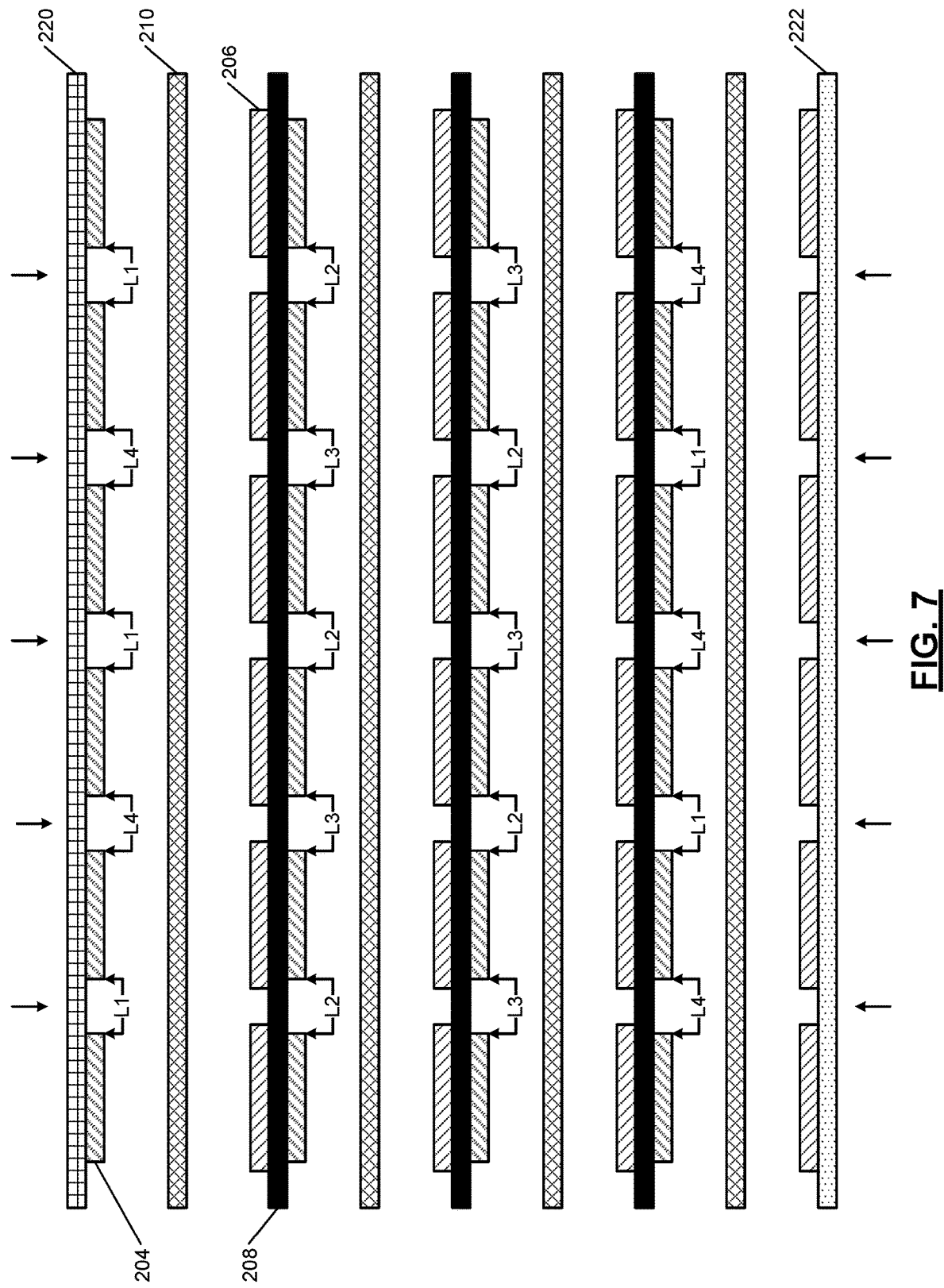
FIG. 7 shows an example layout of electrodes for manufacturing the S-shaped folded stack type battery according to the present disclosure.

FIG. 7 shows the spacing between the cathodes 204 and between the anodes 206 in the S-shaped stack 200 in further detail. FIG. 7 shows a length of a stack of the bipolar electrodes, the layers of the gel 210, and the positive and negative current collectors 220, 222 described above with reference to FIG. 3 from which the S-shaped stack 200 is formed. In FIG. 7, the bipolar electrodes, the layers of the gel 210, and the positive and negative current collectors 220, 222 are shown separately for illustrative purpose. In FIG. 7, $L1<L2<L3<L4$. The values of L1, L2, L3, and L4 depend on the thicknesses of the electrodes and the gel 210. As mentioned above, the anodes 206 are slightly longer than the cathodes 204. Accordingly, the anodes 206 have a larger area than the cathodes 204.

The cathodes 204 on the inner surface of the positive current collector 220 and the cathodes 204 of the bipolar electrodes stacked below the positive current collector 220 can be considered as being arranged in rows and columns as follows. A first cathode 204 on the inner surface of the positive current collector 220 and the cathodes 204 of the bipolar electrodes directly below the first cathode 204 can be considered as being arranged in a first column. A second cathode 204 on the inner surface of the positive current collector 220 adjacent to the first cathode 204 and the cathodes 204 of the bipolar electrodes directly below the second cathode 204 can be considered as being arranged in a second column that is adjacent to the first column; and so on. These columns of cathodes 204 are adjacent to each other along the X-axis.

The cathodes 204 on the inner surface of the positive current collector 220 can be considered as being arranged in a first row. The cathodes 204 of a first bipolar electrode directly under the positive current collector 220 can be considered as being arranged in a second row. The cathodes 204 of a second bipolar electrode directly under the first bipolar electrode can be considered as being arranged in a third row; and so on. These rows of the cathodes 204 are adjacent to each other along the Z-axis.

In the example shown in FIG. 7, there are six columns and four rows of the cathodes 204. In the first and second columns of the cathodes 204, the cathodes 204 in the first row are separated by a distance L1, the cathodes 204 in the second row are separated by a distance L2; the cathodes 204 in the third row are separated by a distance L3; and the cathodes 204 in the fourth row are separated by a distance L4. In the second and third columns of the cathodes 204, the cathodes 204 in the fourth row are separated by a distance L1, the cathodes 204 in the third row are separated by a distance L2; the cathodes 204 in the second row are separated by a distance L3; and the cathodes 204 in the first row are separated by a distance L4. This pattern of separating (i.e., distancing) the cathodes 204 is repeated in subsequent columns along the X-axis.

Accordingly, the cathodes 204 in the rows of the first column are separated from the cathodes 204 in the rows of the second column by distances that increase downwardly in the stack along the Z-axis; the cathodes 204 in the rows of the second column are separated from the cathodes 204 in the rows of the third column by distances that increase upwardly in the stack along the Z-axis; and the pattern is repeated in successive columns.

Due to the above pattern, the stack of the bipolar electrodes, the layers of the gel 210, and the positive and negative current collectors 220, 222 can be folded at the locations shown by the arrows to form the S-shaped stack 200 shown in FIGS. 3 and 6C. Specifically, the above pattern causes the cathodes 204 to align vertically across the folds of the S-shaped stack 200. Further, the above pattern ensures that the bipolar current collectors 208, the layers of the gel 210, and the positive and negative current collectors 220, 222 turn at each fold of the S-shaped stack 200 as shown in FIGS. 3 and 6C.

Figure 8:
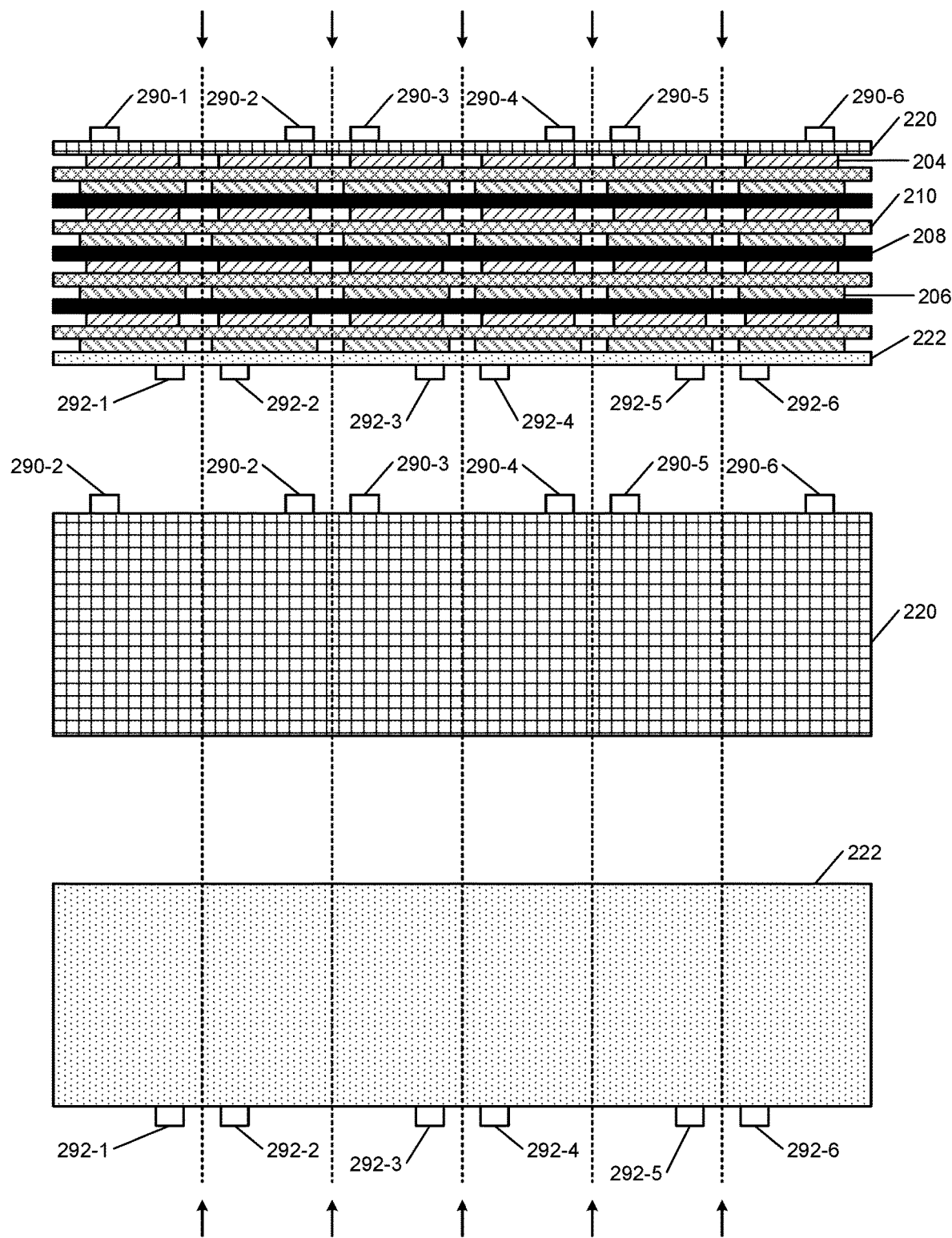
FIG. 8 shows an example of a folding scheme and layout of tabs on current collectors of the S-shaped folded stack type battery according to the present disclosure.

FIG. 8 shows the alignment of tabs on the positive and negative current collectors 220, 222. The top of FIG. 8 shows a cross-sectional view of the same stack of the bipolar electrodes, the layers of the gel 210, and the positive and negative current collectors 220, 222 shown in FIG. 6A. In the middle of FIG. 8, in a top view of the stack, the positive current collector 220 includes a plurality of tabs 290-1, 290-2, ..., and 290-6 (collectively the tabs 290). At the bottom of FIG. 8, in a bottom view of the stack, the negative current collector 222 includes a plurality of tabs 292-1, 292-2, ..., and 292-6 (collectively the tabs 292). When the stack is folded at the locations indicated by the arrows, the tabs 290 of the positive current collector 220 are offset relative to the tabs 292 of the negative current collector 222, respectively.

Figure 9A:
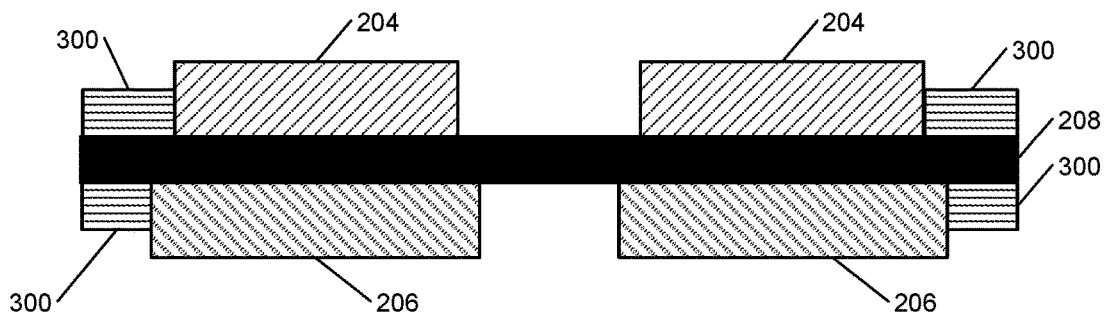
FIGS. 9A-10B show examples of using blockers with the S-shaped folded stack type battery according to the present disclosure.

FIGS. 9A-10B show different ways of using a blocker 300 (e.g., a polymer) with the S-shaped stack 200. FIG. 9A shows the bipolar electrode shown in FIG. 5 except that some of the details shown in FIG. 5 are omitted to focus on the blocker 300 in FIG. 9A. In FIG. 9A, the blocker 300 is used at the edges of the bipolar electrode. That is, the blocker 300 is used on the sides of adjacent cathodes 204 of the bipolar electrode and on the sides of adjacent anodes 206 of the bipolar electrode. FIG. 9B shows a top view of the S-shaped stack 200 with the blocker 300 used at the edges of the bipolar electrodes. FIG. 9C shows a bottom view of the S-shaped stack 200 with the blocker 300 used at the edges of the bipolar electrodes. Thus, the blocker 300 fills the areas of the turns (i.e., the folds) of the S-shaped stack 200 shown in FIG. 3.

Figure 10A:
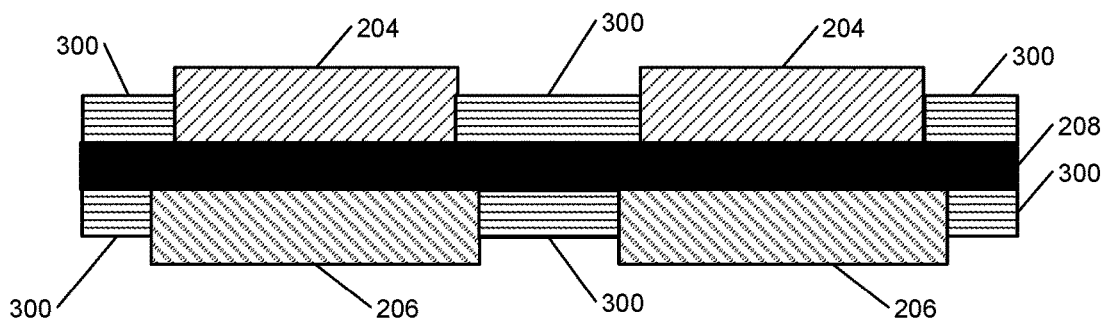
Figure 10B:
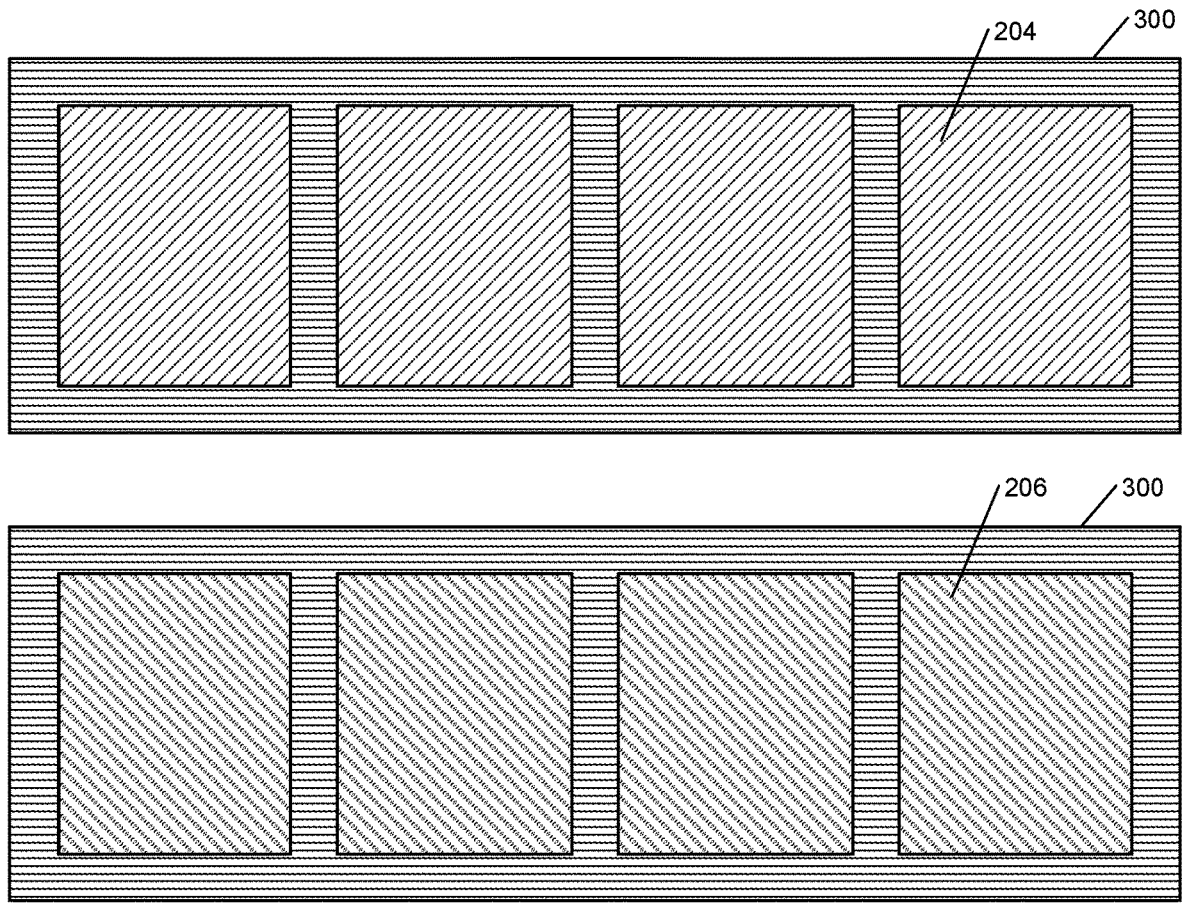

FIG. 10A shows that the blocker 300 can be additionally used between the adjacent cathodes 204 of the bipolar electrodes and between the adjacent anodes 206 of the bipolar electrode. FIG. 10B shows top and bottom views of the S-shaped stack 200 with the blocker 300 used at the edges of the bipolar electrodes and between the adjacent cathodes 204 and between the anodes 206 of the bipolar electrodes.

Figure 9B:
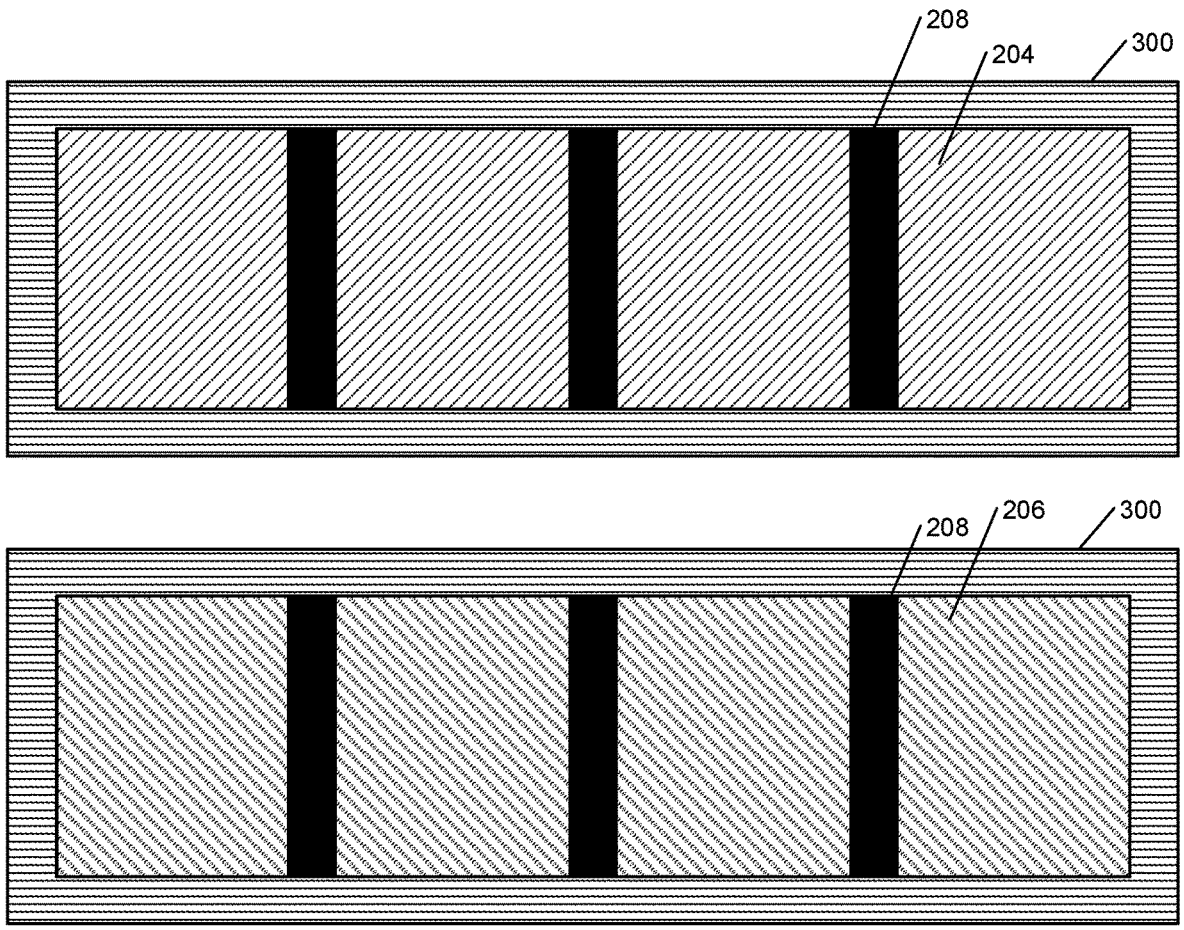

The blocker 300 at the four edges can be optional based on the chemistry used in the battery. For example, if the flexible ion conductive film (i.e., the gel 210) or the ion conducting material 270 used inside the electrodes is a gel or a liquid electrolyte, the blocker 300 is used at the four edges of the bipolar electrodes as shown in FIGS. 9A and 9B to prevent liquid leakage at high temperatures. If the material 270 is a solid electrolyte or a combination of a polymer and a lithium salt, there will be no leakage of a liquid-like material, and the blocker 300 need not (but may) be used at the four edges of the bipolar electrodes as shown in FIGS. 9A and 9B.

FIGS. 11A and 11B show other ways of folding a continuous length of a stack of the bipolar electrodes, layers of the gel 210, and the positive and negative current collectors 220, 222 described above with reference to FIG. 3 from which the S-shaped stack 200 and other S-shaped stacks can be formed. FIG. 11A shows the same stack shown in FIGS. 6A and 8. FIG. 11A shows arrows that point to locations where the S-shaped folding can be performed along the length of the stack. For example, the stack can be folded after each column of the electrodes, after every other column of the electrodes, using a combination thereof, or in any other way.

FIG. 11B shows a first stack similar to the stack of FIG. 11A that is arranged on top of a second stack that is an inverted version of the first stack except that only one of the two stacks has the negative current collector 222, which is common to both the stacks. The combined stack can be folded at locations indicated by the arrow. Other folding schemes described with reference to FIG. 11A can be used.

Further, the combination of the two stacks shown in FIG. 11B can be further extended along the Z-axis by stacking one or more stacks of FIG. 11A onto the combined stack of FIG. 11B and by using common positive and/or negative current collectors 220, 222 between adjacent stacks. Furthermore, any of the folding schemes used with the stacks of FIGS. 11A and 11B can be used with these extended stacks. Thus, the S-shaped stack can be scaled not only along the Z-axis but also along the X-axis or using a combination thereof.

The stacks shown and described with reference to FIGS. 3-12C can be laminated before folding. The lamination temperature can be higher than the glass transition temperature and lower than the melting point of the polymer used in the glue used to bond the stacks.

Figure 12A:
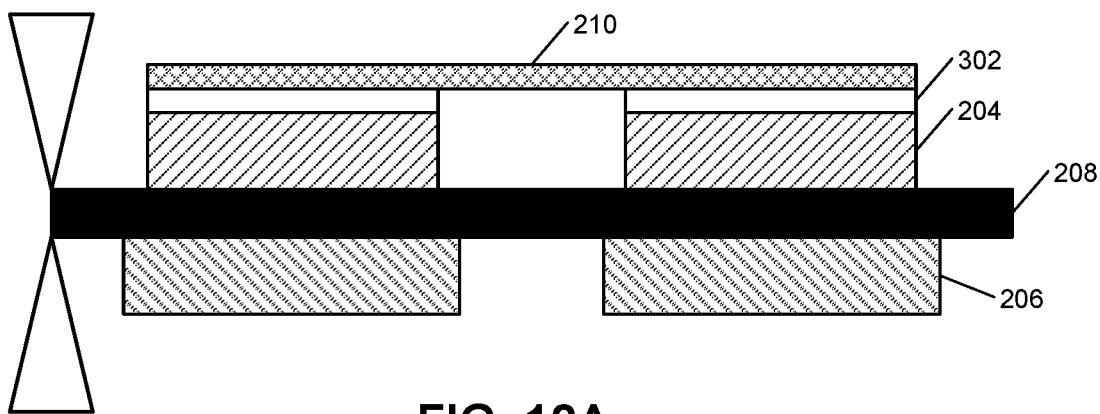
FIGS. 12A-12C show additional designs of bipolar electrodes according to the present disclosure.
Figure 12B:
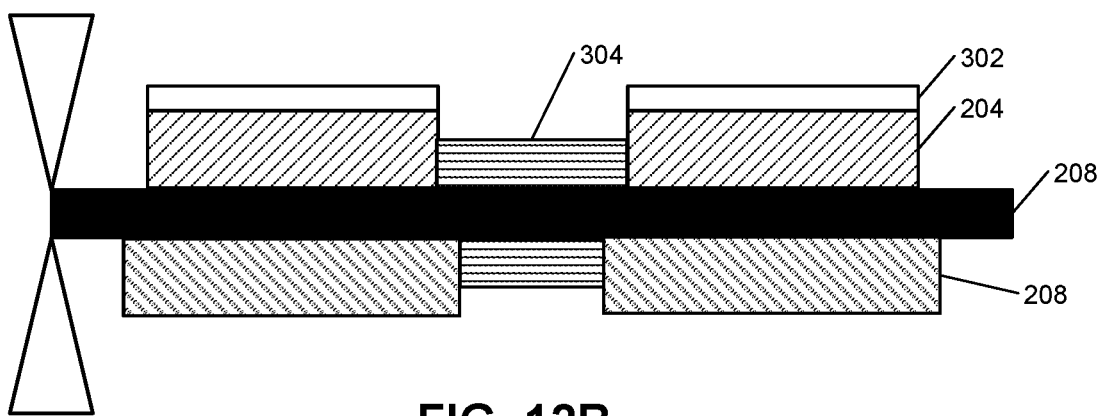

FIGS. 12A-12B show additional designs of bipolar electrodes according to the present disclosure. FIG. 12A shows another example of a bipolar electrode. The bipolar electrode comprises the cathodes 204 and the anodes 206 separated by the bipolar current collector 208. The top surfaces of the cathodes 204 are coated with a solid state electrolyte 302. Subsequently, a layer of the gel 210 is arranged on the electrodes. Thereafter, the resulting structure is stacked and sandwiched between the positive and negative current collectors 220, 222 and folded as described above with reference to FIG. 3.

Figure 12C:
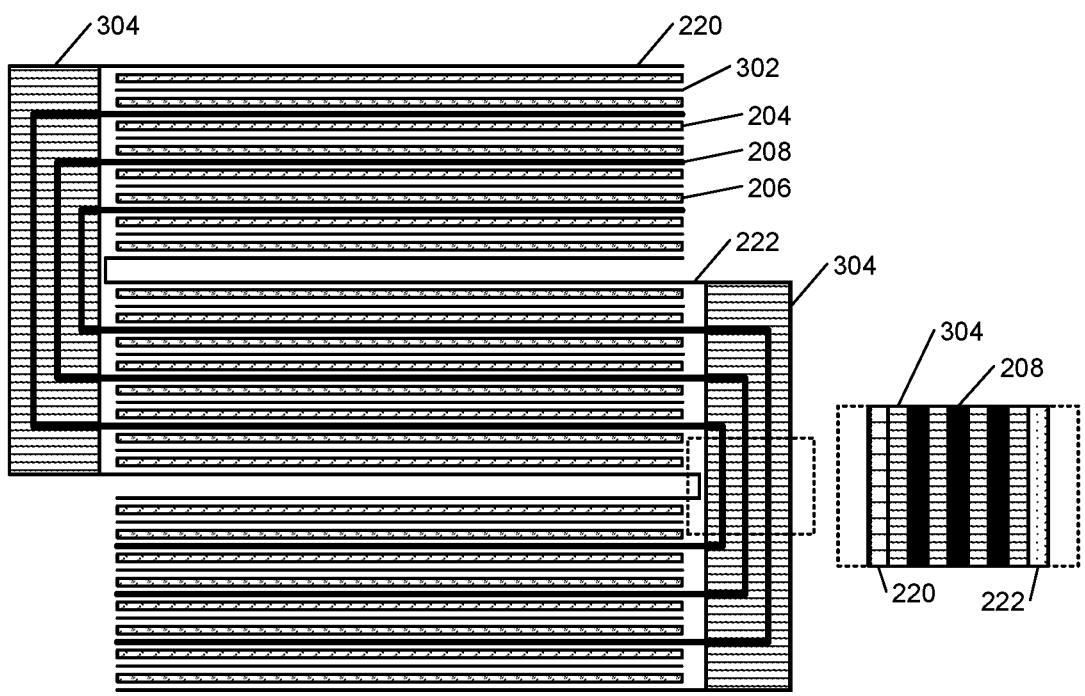

FIG. 12B shows another example of a bipolar electrode. The bipolar electrode of FIG. 12 differs from the bipolar electrode of FIG. 12A in that the bipolar electrode of FIG. 12 does not include the layer of the gel 210 and includes a blocker 304 between the cathodes 204 and between the anodes 206. After stacking and folding as described above with reference to FIG. 3, the resulting S-shaped folded stack is shown in FIG. 12C. The above description related to the tabs, the folding schemes, and the pattern of spacing the cathodes and anodes applies equally to the S-shaped folded stack shown in FIG. 12C.

In additional implementations, the layers of the gel 118 shown in FIG. 1 can be extended to a traditional separator used in traditional lithium ion batteries if the batteries use a strong blocker at the edge. The resulting stack can also be folded into an S-shaped stack according to the teachings of the present disclosure.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A battery comprising:
   positive and negative current collectors; and
   a plurality of bipolar electrodes arranged in a stack between the positive and negative current collectors,
   wherein the positive and negative current collectors and the stack of the plurality of bipolar electrodes are folded in an S-shape;
   wherein first and second electrodes of the bipolar electrodes do not extend into the folds of the S-shaped stack; and
   wherein:
   the plurality of bipolar electrodes is arranged in the stack along a vertical axis;
   the stack comprises rows of the first electrodes and rows of the second electrodes of the bipolar electrodes, the first and second electrodes arranged in respective rows along a horizontal axis, the rows of first electrodes and the rows of second electrodes alternating along the vertical axis forming columns of the first and second electrodes along the vertical axis, each of the columns comprising the first and second electrodes alternating along the vertical axis; and
   wherein in each pair of successive columns, the first electrodes in the rows of a first column are separated from the first electrodes in the rows of a second column by distances that increase downwardly in the stack along the vertical axis.

2. The battery of claim 1 further comprising a plurality of layers of a flexible ion conducting film arranged between the positive and negative current collectors and between the bipolar electrodes.

3. The battery of claim 1 wherein each of the bipolar electrodes comprises:
a bipolar current collector that extends along lengths of the positive and negative current collectors,
wherein the first and second electrodes are arranged on opposite sides of the bipolar current collector; and
wherein a spacing between the first electrodes and between the second electrodes increases from first to last ones of the bipolar electrodes in a first fold of the S-shaped stack and decreases from the last to the first ones of the bipolar electrodes in a second fold of the S-shaped stack.

4. The battery of claim 3 further comprising:
a plurality of layers of a flexible ion conducting film arranged between the positive and negative current collectors and between the bipolar electrodes;
wherein the positive and negative current collectors respectively comprise pluralities of cathodes and anodes;
wherein the first and second electrodes of the plurality of bipolar electrodes and the pluralities of cathodes and anodes of the positive and negative current collectors are vertically aligned with each other across the folds of the S-shaped stack; and
wherein only portions of the positive and negative current collectors, the layers of the flexible ion conducting film, and bipolar current collectors of the bipolar electrodes extend through the folds of the S-shaped stack.

5. The battery of claim 3 further comprising a blocker arranged along edges of the bipolar electrodes, in the spacing between the first electrodes and between the second electrodes of the bipolar electrodes, or both.

6. The battery of claim 1 wherein the positive and negative current collectors respectively comprise first and second pluralities of tabs and wherein the first plurality of tabs are offset relative to the second plurality of tabs in the S-shaped stack.

7. The battery of claim 1 further comprising:
an additional current collector; and
a second plurality of bipolar electrodes arranged in a second stack between the additional current collector and one of the positive and negative current collectors,
wherein the additional current collector and the second plurality of bipolar electrodes are folded in the S-shape along with the positive and negative current collectors and the stack of the plurality of bipolar electrodes.

8. The battery of claim 1 wherein the bipolar electrodes are coated with a solid-state electrolyte.

9. The battery of claim 1 wherein the bipolar electrodes are coated with a solid-state electrolyte, the battery further comprising a blocker arranged in spacing between individual electrodes of the bipolar electrodes.

10. The battery of claim 1 wherein:
the bipolar electrodes are coated with a solid-state electrolyte;
each of the bipolar electrodes comprises the first and second electrodes arranged on opposite sides of a bipolar current collector;
the positive and negative current collectors respectively comprise pluralities of cathodes and anodes;
the first and second electrodes of the plurality of bipolar electrodes and the pluralities of cathodes and anodes of the positive and negative current collectors are vertically aligned with each other across the folds of the S-shaped stack; and
wherein only portions of the positive and negative current collectors and bipolar current collectors of the bipolar electrodes extend through the folds of the S-shaped stack.

11. The battery of claim 10 further comprising a blocker arranged in a spacing between the first electrodes and between the second electrodes of the bipolar electrodes.

12. The battery of claim 2 wherein the flexible ion conducting film comprises a material that conducts ions without conducting electrons and wherein the material includes one or more of a free-standing gel, a combination of a polymer and a lithium salt, a combination of a polymer and a solid-state electrolyte, a combination of a separator and a liquid electrolyte.

13. The battery of claim 3 wherein the bipolar current collector provides electronic conductivity without providing ionic conductivity and wherein the bipolar current collector comprises a metal foil, a clad foil, a combination of a polymer and carbon, or a combination of a polymer and metal particles.

14. The battery of claim 1 wherein the first and second electrodes comprise active materials that provide electronic conductivity and an ion conducting agent that provides ionic conductivity.

15. The battery of claim 14 wherein the first and second electrodes further comprise carbon that provides electronic conductivity and wherein the ion conducting agent includes one or more of a solid electrolyte, a gel, a combination of a polymer and a lithium salt, or a liquid electrolyte.

16. The battery of claim 1 wherein each of the bipolar electrodes comprises the first and second electrodes arranged on opposite sides of a bipolar current collector; and
wherein a spacing between the first electrodes and between the second electrodes increases from first to last ones of the bipolar electrodes in a first fold of the S-shaped stack and decreases from the last to the first ones of the bipolar electrodes in a second fold of the S-shaped stack.

17. The battery of claim 16 wherein the first and second folds are located after successive ones of the first electrodes.

18. The battery of claim 16 wherein the first and second folds are located after alternating ones of the first electrodes.

19. The battery of claim 10 wherein each of the bipolar electrodes comprises the first and second electrodes arranged on opposite sides of the bipolar current collector; and wherein a spacing between the first electrodes and between the second electrodes increases from first to last ones of the bipolar electrodes in a first fold of the S-shaped stack and decreases from the last to the first ones of the bipolar electrodes in a second fold of the S-shaped stack.

20. The battery of claim 19 wherein the first and second folds are located after successive or alternating ones of the first electrodes.

* * * * *